Jan. 18, 1938.   E. D. LILJA   2,105,666
SYNCHRONOUS MOTOR
Original Filed Jan. 13, 1933
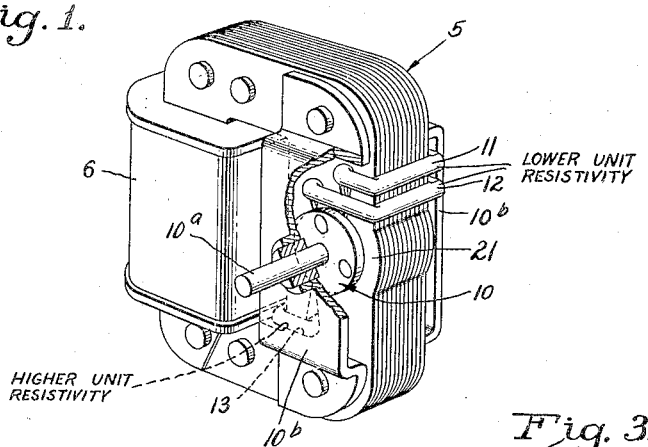
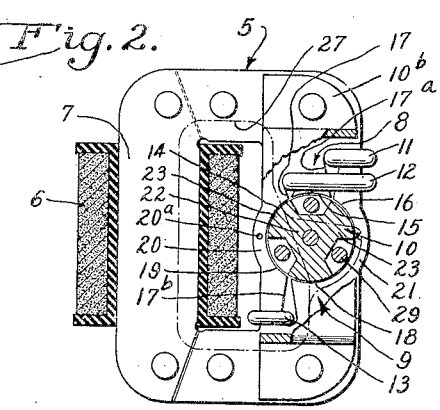
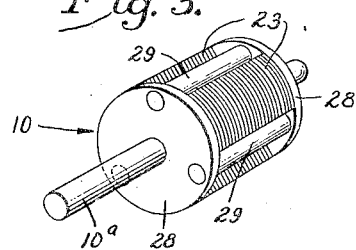
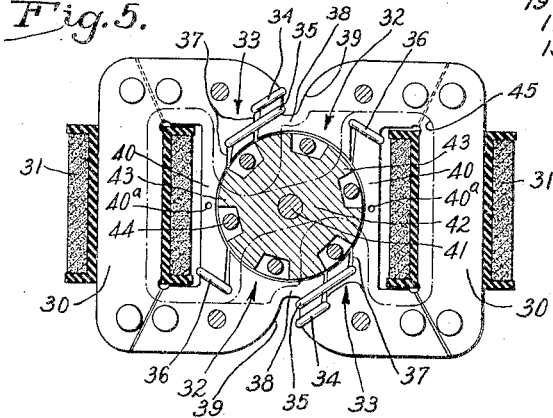
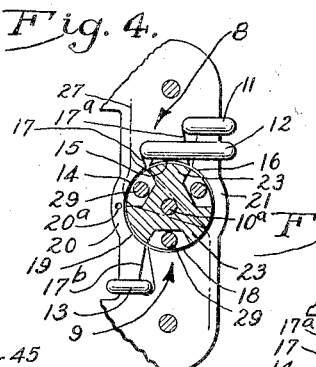
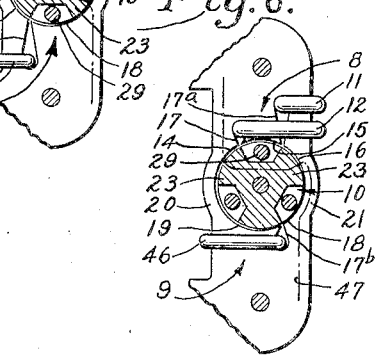
INVENTOR
Edgar D. Lilja
BY
Parker, Carlson, Pitzner & Hubbard
ATTORNEYS Patented Jan. 18, 1938

2,105,666

UNITED STATES PATENT OFFICE 2,105,666

SYNCHRONOUS MOTOR

Edgar D. Lilja, Rockford, Ill., assignor to Howard D. Colman, Rockford, Ill.

Continuation of application Serial No. 651,515, January 13, 1933. This application April 6, 1935, Serial No. 15,042

26 Claims. (Cl. 172—278)

My invention relates to small synchronous alternating current motors adapted to operate at a sub-synchronous speed and has more particular reference to a motor of this character in which shifting of the magnetic field is produced by the action of shading rings.

The primary object of the present invention is to provide a sub-synchronous motor which will start and pull into synchronism under a load substantially greater than motors of similar character heretofore used.

Another object is to coordinate the construction of the stator and rotor in a motor of the above character in a manner such as to produce a reaction torque therebetween tending to establish a comparatively high sub-synchronous speed, and produce strong induction motor action not only for initiating rotation of the motor but also to augment the reaction torque whereby to produce a substantially higher power output than could be had in prior sub-synchronous motors.

The invention also resides in the novel manner by which the strong synchronous characteristics are obtained.

A further object is to construct the stator in a manner such as to prevent the rotor from over-running its established synchronous speed under the induction motor action developed.

Other objects and advantages of the invention will become apparent from the following detailed description, taken in connection with the accompanying drawing, in which Figure 1 is a perspective view of a motor embodying the features of the present invention, a portion of one of the bearings being broken away.

Fig. 2 is an elevational view of the motor shown in Fig. 1, the rotor being shown in section.

Fig. 3 is a perspective view of the rotor.

Fig. 4 is a fragmentary view of a portion of Fig. 2 showing the rotor in a different position.

Fig. 5 is a view of a four pole motor constructed in accordance with the present invention.

Fig. 6 is a view similar to Fig. 4 illustrating a modification.

In the exemplary embodiment shown in Figs. 1 to 4, the motor is constructed with a stator or primary member of the two pole core type comprising a rectangularly shaped laminated field member 5 approximately two and five-eighths inches long, two inches wide and five-eighths inches thick. A main winding 6 providing a magneto-motive force of approximately 500 ampere turns encloses one side leg 7 of the member 5 and when excited with alternating current produces a high flux density in all parts of the stator iron. The winding 6 is adapted to be energized from a single phase source of alternating current such as a household lighting circuit. The other side of the field member defines two pole pieces 8 and 9 with opposed faces defining a recess in which a rotor or secondary member 10 is disposed. The latter is fast on a shaft 10$^a$ journaled at opposite ends of the rotor in bearings supported by plates 10$^b$ rigidly secured at opposite ends to the field member 5. The primary and secondary members are relatively rotatable, the primary member being preferably fixed in order to avoid the use of slip ring connections or the like in the supply circuit of the energizing winding.

Shifting of the magnetic field around the rotor 10 is produced by the well known action of shading or short-circuited rings enclosing side portions of the pole pieces adjacent the rotor. For a purpose to later appear, the poles of opposite sign are differentially or unequally shaded in the present instance, there being two rings 11 and 12 on the pole piece 8 and one ring 13 on the pole piece 9. The rings 11 and 13 enclose approximately one-third of the respective pole sections and, for the size of motor shown, have resistances within a range of approximately 1 to $2 \times 10^{-4}$ ohms. Preferably, the ring 11 is formed from No. 8 B. & S. gauge copper wire while the ring 13 is made from No. 10 wire. The larger ring 12 may be of the same size wire as the ring 11, enclosing the same sectional area and an adjacent section preferably not greater than that enclosed by the ring 11.

With the shading rings arranged as above described, the face of pole piece 8 is divided into unshaded, single shaded and double shaded areas 14, 15, and 16 which are separated by slots 17 and 17$^a$ and in which the magnetic flux reaches its peak value successively, producing a gradual shifting of the magnetic field in a clockwise direction as viewed in Fig. 2. The face of the pole 9 is divided by the slot 17$^b$ into unshaded and shaded areas 18 and 19, and for this reason, a less progressive shifting of the field takes place across the face of this pole. Also the shading effect of the ring 13 is less than that of the rings 11 and 12. As a result of this differential or unequal shading of the two poles, the magnetic field does not shift uniformly across the faces of the two poles. In view of the low resistance of the shading rings 11 and 13, each of the stator poles is heavily shaded as a result of which the flux threading the rotor from the shaded areas attains a maximum value approximately sixty electrical degrees later than does the flux from the unshaded areas.

To enable a powerful induction motor action and strong synchronous characteristics to be obtained, the field member 5 is constructed with extensions 20 and 21 of the unshaded side tips of the pole pieces 8 and 9, which extensions provide magnetic connections between the adjacent side tips of the poles. These extensions are uninterrupted at least up to the median plane between the adjacent poles by any nonmagnetic restriction greater in magnetic effect than an air gap $\frac{1}{32}$ of an inch wide. In the present instance, each unshaded side tip is integrally joined to the shaded side tip of the pole of opposite sign. In the case of the pole piece 8, the unshaded tip extension 20 thereof is interrupted, for a purpose to appear later, by a magnetic restriction in the form of a hole $20^a$ preferably located about midway between the poles. The continuous inner surfaces of the extensions which closely follow the rotor surface constitute enlargements of the unshaded pole areas 14 and 18, thereby rendering additional iron of the rotor available for the entry of the unshaded flux.

If a bi-polar synchronous rotor were used in the rotating field produced when the two pole stator above described is energized by ordinary 60 cycle alternating current, such a rotor would revolve at the same speed as the field, that is, 3600 R. P. M. The present motor is constructed to possess strong synchronous characteristics at the same time establishing a synchronous operating speed substantially below the natural synchronous speed determined by the number of stator poles. To this end, the rotor 10 is composed of magnetizable material of low magnetic retentivity such as highly permeable iron and comprises a core 22 from which extend equally spaced solid laminated projections 23 greater in number than the number of stator poles and constituting salient poles. Thus, if there are N poles on the stator, N+M poles are used on the rotor so that a well defined subsynchronous operating speed is had which is a fraction of the theoretical or true synchronous speed of the motor as determined by the number of stator poles. In general, one rotor projection advances past a predetermined point on one unshaded pole section of the stator for each half cycle of the energizing current.

The number of rotor poles is preferably close to the number of stator poles so that a high sub-synchronous speed will be had. In addition, an odd number of rotor poles is preferably used for each pair of stator poles. Thus, in the present instance, there are three rotor poles for each pair of stator poles of opposite sign and each rotor pole is formed with sides disposed substantially radially including a polar arc at least equal to one-fourth of the rotor pole pitch and preferably of approximately sixty degrees where a three pole rotor and two pole stator are used and optimum synchronous characteristics are desired. The adjacent poles 23 thus define a segmental air gap the circumferential length of which is the same as that of the poles 23 and slightly greater than that of the single shaded area 15 of the pole piece 8.

For reasons to appear later, best results are obtained when the poles are of a height approximately one-half of the rotor radius, being five thirty-seconds of an inch for the present rotor, the diameter of which is 0.664 inch.

The rotor constructed with three salient poles tends to revolve synchronously at 2400 R. P. M. in the magnetic field created by the two pole stator when the latter is excited from a 60 cycle source. This speed is maintained primarily by the action of the unshaded areas of the two poles 8 and 9 acting as separate magnetic poles which become strongly polarized each time the unshaded flux rises to its peak value which occurs 7200 times a minute. In each polarization, an attractive force is exerted on the rotor poles then positioned nearest the unshaded pole areas, the greatest attraction occurring when the unshaded flux reaches its peak value with the rotor positioned as shown in Fig. 2, with one pole 23 directly opposite the unshaded area 14 and the adjacent air gap opposite the single shaded area 15. Another rotor pole will then be positioned directly opposite the unshaded face area 18 of the pole piece 9 and adjacent the shading ring slot $17^b$ while the third rotor pole will be disposed opposite the double shaded area 16 and the extreme end of the extension 21 of the pole 9.

With the rotor positioned relative to the stator poles as above described, it will be apparent that the unshaded flux will thread the rotor along a path represented by lines 27 which separate at the rotor pole opposite the area 14 and then extend through the other two poles. The path thus provided is of low reluctance owing to the absence of an air gap of appreciable width therein or the inclusion therein of any of the stator iron enclosed by shading rings. Moreover, the slots 17, $17^a$, and $17^b$ and the hole $20^a$ are so spaced as to effectually avoid diversion of any substantial amount of unshaded flux out of the desired path through the rotor, the slot $17^a$ and the hole $20^a$ being so spaced as to confine the unshaded flux of one stator pole to an area 14 which spans only one of the rotor pole projections. Substantially all of the available unshaded flux will thus be utilized in causing a strong attractive force to be exerted on the rotor pole, under the area 14 when it is in the position shown in Fig. 2.

From a comparison of Figs. 2 and 4 and consideration of the intervening positions which the rotor may occupy, it will be apparent that there is only one position (Fig. 2) which is favorable to the attraction of a rotor pole with a force of substantial magnitude. With the rotor positioned as shown in Fig. 4, the reluctance of the magnetic path through the rotor and the unshaded pole areas is a maximum owing to the fact that one non-magnetic segment of the rotor is disposed opposite the unshaded area 14 and diversion of flux from such area and around the rotor is effectually reduced by the hole $20^a$ and the adjacent slot 17. In addition, the shaded flux is, owing to the heavy shading of the poles as above described, so reduced in magnitude that no appreciable locking action is produced thereby. The reluctance of the path through the unshaded areas decreases progressively as the rotor moves from the position shown in Fig. 4 to the synchronous position of Fig. 2 and increases to a maximum as the next non-magnetic rotor segment is presented to the area 14. It follows therefore that only the unshaded flux is of sufficient strength to produce the desired locking action on the rotor and there is only one positional relation of the stator and rotor poles which is of sufficiently low reluctance to cause strong attraction of the rotor poles by this flux. This will be apparent from a consideration of the positions of the rotor projections or magnetic segments with relation to the pole pieces on the stator.

Thus, the unshaded portion of the lower stator projection 9 is of major-extent and covers approximately 180 degrees of the rotor periphery or the length of three of the minor-extent peripheral segments thereof. Consequently, the reluctance of the magnetic path between this unshaded portion of the stator pole 9 and the rotor varies less than 50 per cent during rotation of the rotor. The face 14 of the unshaded portion of the upper pole 8, however, covers only one of the minor-extent segments of the rotor and consequently, the reluctance of the magnetic path between the rotor and the face or pole piece 14 varies approximately 100 per cent during rotation of the rotor. In general, then, the stator or primary member is provided with one pole piece having an unshaded portion of major-extent which cooperates with the rotor portion to form a flux path varying less than 50 per cent from its maximum value of reluctance while a second pole piece has an unshaded portion forming a flux path that varies approximately 100 per cent in reluctance thus exerting a strong synchronizing effect on the rotor.

The synchronous position (Fig. 2) above referred to is defined accurately owing to the fact that the rotor poles and the intervening nonmagnetic gaps are of equal circumferential length substantially equal to the distance measured circumferentially between the hole 20$^a$ and the slot 17 and also the distance between the slots 17 and 17$^a$. With this arrangement, it will be apparent that the reluctance of the path 27, which is a minimum with the rotor positioned as shown in Fig. 2, will increase rapidly as the rotor is shifted in either direction, becoming a maximum when the adjacent air gap comes opposite the area 14 as shown in Fig. 4. The locking position of the rotor is thus defined accurately.

The factors above described combine effectually to cause powerful attractive forces to be exerted on the rotor poles when the rotor is locked in step with the pulsating stator field. A powerful torque is thus developed tending to prevent the rotor from being pulled out of synchronism under a load or over-running the established synchronous speed under the induction motor action later to be described.

To produce a torque for initiating operation of the motor automatically and to augment the torque due to the synchronous characteristics when the rotor is at synchronous speed, conductors in which currents may be induced are mounted on the rotor. Preferably, these conductors form a squirrel cage for which the iron of the rotor 10 forms a core. Herein, the squirrel cage comprises disks 28 of copper at opposite ends of the rotor electrically connecting corresponding ends of copper inductor bars 29 which are disposed in the grooves defined by the adjacent poles of the rotor. The inductor bars may be of any desired cross-sectional shape, and for best performance in the motor shown, the bars should have a cross-sectional area equivalent to No. 7, 8 or 9 B. & S. gauge wire. The bars shown herein are formed of No. 8 gauge wire.

With this squirrel cage rotor, the motor starts as a result of the well known induction motor action caused by reaction of the rotating magnetic field and the current induced in the squirrel cage. Owing to the high flux densities obtained, the efficient arrangement of the sharing coils resulting in heavy shading and substantial phase displacement, and the manner of distributing the unshaded flux to the rotor iron resulting from the use of the extensions 20 and 21, a comparatively high torque is developed to initiate rotation of the rotor, in the present instance, even though the amount of available rotor iron is decreased considerably as a result of forming the rotor with salient poles and intervening nonmagnetic segments.

As a true induction motor, when excited from a 60 cycle source, the present motor has a theoretical synchronous speed of 3600 R. P. M., the speed of rotation of the magnetic field, but owing to slippage between the rotor and the field, the actual speed at which the rotor tends to run under the torque developed by the induction motor action alone is substantially less than 3600 R. P. M. yet greater than that established by the synchronous character of the rotor. In fact, with the stator and rotor constructed as above described, the most efficient induction motor speed is very near 2400 R. P. M., that is to say, the product of the speed and torque has a theoretical maximum at this speed. It will be apparent, therefore, that the full effect of the torque due to the induction motor action is exerted not only during self-starting of the rotor but also in accelerating the rotor all the way up to the established sub-synchronous speed, since as was before noted the sub-synchronous speed is also 2400 R. P. M. for this motor. The term "theoretical maximum" has been used since it is apparent that the actual maximum is determined by the sub-synchronous speed. In other words, the sub-synchronous speed might be so low that the rotor would be locked into step at this low speed long before it had attained the speed commensurate with the theoretically most efficient induction operation. The present motor relates these speeds in such manner that the strong induction characteristics are fully utilized.

In addition, with a rotor of the above character operating in the stator described, a very powerful starting torque is developed which is capable not only of overcoming the torque tending to lock the rotor in the position shown in Fig. 2, but also of exerting torque of substantial magnitude for initiating rotation of the rotor. As a result, the motor will start and accelerate to the established sub-synchronous speed under a load substantially greater than the shaded pole motors heretofore used. Moreover, in view of the fact that the motor operates at the highest possible sub-synchronous speed for a two pole stator, a maximum power output of the motor is obtained. When the synchronous speed has once been attained, the load may be increased substantially without pulling the motor out of synchronism. This powerful pull-out torque is due to a combination of the induction motor action and the synchronous motor action which latter is attained as above described when the rotor is revolving at or near synchronous speed.

In addition to their function of distributing the unshaded flux so that the latter will act with maximum effectiveness in producing a powerful synchronous action, the extensions 20 and 21 contribute to the development of the powerful induction motor torque. This is due primarily to the efficient maner in which the unshaded flux is distributed to the rotor iron by enlargement of the unshaded areas of the poles so that the average amount of unshaded flux passed through the rotor during a cycle is the maximum consistent with the maintenance of definite maximum and minimum flux positions. In this way, the current induced in the squirrel cage winding is increased and the induction motor torque accordingly improved without impairing the accuracy with which the synchronous position of the rotor relative to the unshaded pole areas is defined.

By virtue of the induction motor action above referred to, it will be apparent that the rotor, when the motor is under a light load, tends to over-run its established synchronous speed. This tendency is counteracted by the synchronous action above described, for the reason that strong retarding impulses are exerted on the rotor poles if the latter run ahead of the field and one is disposed in advance of the position shown in Fig. 2 at the time when the unshaded flux reaches its peak value. To further insure against such over-run, the rotating magnetic field is rendered somewhat discontinuous in the present motor by shading the stator poles differentially thereby reducing the induction motor action available for carrying the rotor beyond synchronous speed. This is attained by using only one shading ring 13 on the pole piece 9 or by constructing this ring to possess a weaker shading effect than the combined effect of the rings 11 and 12. As a result, the pole 9 is rendered less effective than the double shaded pole 8 causing the slippage necessary to enable the established synchronous speed to be maintained. Moreover, the dynamic braking effect of the less heavily shaded pole is increased which also contributes to the maintenance of the synchronous speed.

It has been found that the height of the rotor poles 23 is of importance in maintenance of the established synchronous speed. This is for the reason that if these poles are made substantially shorter than above described, the rotor would more nearly resemble a true squirrel cage rotor and its synchronous characteristics would be reduced accordingly. By constructing the rotor with poles of greater height than shown, the iron adjacent the rotor shaft available for carrying the flux would be reduced resulting in a reduction in the amount of flux threading the rotor and a corresponding reduction in the synchronous and induction motor torque.

The present invention may be embodied in shading ring motors having more than two poles. For example, Fig. 5 shows a motor having four stator poles and a rotor constructed to revolve at 1200 R. P. M. This motor has a field or primary member comprising four annularly spaced pole pieces arranged in pairs 32, 33 and connected by a core 30 enclosed by a winding 31. When the winding 31 is excited by single phase alternating current, the adjacent pole pieces are oppositely polarized while the alternate pieces are of the same sign.

For the purposes above described in connection with the motor shown in Fig. 2, the pole pieces 32 and 33 of each pair are differentially shaded, there being two rings 34 and 35 on each of the pole pieces 33 and one ring 36 on each of the pole pieces 32, arranged in a manner similar to the shading rings 11, 12 and 13. Slots 37 separating the differently shaded sections are inclined relative to radii of the rotor in order that the proper spacing of the differently shaded sections of the different poles may be obtained even though the polar projections are not equally spaced.

The unshaded side tip of each pole 32 is integrally joined to the shaded side tip of the adjacent pole 33 by an extension 38 defining the root of a V-shaped notch 39 in which one side of the shading rings 34 and 35 is disposed. Extensions 40 integral with the unshaded side tips of the poles 33 and the shaded side tips of the poles 32 form similar enlargements of the unshaded area of the former poles. Holes 40ª are formed at the center of the extensions 40.

The rotor or secondary member employed is mounted on a shaft 41 journaled at opposite ends in bearing plates (not shown) secured to the projections 32 and 33. To obtain the desired synchronizing and induction motor characteristics, the same as in the two pole motor above described, the rotor comprises a laminated substantially circular core 42 having salient poles 43 projecting therefrom with their minor-extent faces terminating adjacent the faces of the poles 32 and 33, the poles 32 having major-extent unshaded pole faces thereon. The rotor carries a squirrel cage formed by inductor bars 44 electrically joined at corresponding ends by copper disks (not shown).

As in the case of the two pole motor first described, the number of rotor poles 43 is greater than the number of stator poles, there being six poles in the present instance equally spaced apart a distance slightly greater than the circumferential length of the single shaded face area of the poles 33. When the rotor is positioned as shown in Fig. 5, a rotor pole will be disposed opposite each of the unshaded face areas of the poles 33 and the adjacent pairs of rotor poles will be opposite the extensions 38 and double shaded areas of the poles 33 and a magnetic path of low reluctance as indicated by the lines 45 will be available for the unshaded flux. Owing to its strong synchronous characteristics, the rotor tends to lock in step with the pulsations of the unshaded field, its successive poles moving into the positions shown in Fig. 5 as the unshaded flux reaches its peak values. Since the magnetic field set up through the unshaded area of the poles 33 attains a peak value 7200 times a minute with 60 cycle excitation, the rotor thus constructed will turn at 1200 R. P. M. which is the established synchronous speed of the motor when connected to a 60 cycle source of supply. As in the case of the two pole motor described above, the stator or primary member is provided with an unshaded pole piece having a face of major-extent as compared to the minor-extent segments or projections on the rotor and which covers approximately three of the rotor segments so that the reluctance of the flux path from this unshaded portion of the pole piece to the rotor varies less than 50 per cent during rotation of the rotor. The stator is also provided with an unshaded pole piece which is approximately equal in length to one of the segments of the rotor so that the reluctance of the flux path from this latter pole piece to the rotor varies approximately 100 per cent upon rotation of the rotor, thus exercising a strong synchronizing effect thereon.

It will be apparent that in the four pole motor, the induction motor action contributes to the pull-in torque in the same manner and that the poles 32 and 33 are differentially shaded for the same reason as in the two pole motor first described.

Fig. 6 illustrates another modification substantially identical in construction to that shown in Figs. 1 to 4, except that no holes are placed in the pole extensions 20 and 21 and the differential shading of the poles is obtained by the use of a ring 46 on the pole 9 preferably enclosing a greater sectional area of the pole and having greater resistance than the ring 13 of the motor first described. From a comparison of the various embodiments illustrated it will be seen that the desired unsymmetrical distribution of the unshaded and shaded fluxes or differential shading may be had either by using shading rings on different poles enclosing different areas of the pole pieces or by augmenting the shading flux in certain portions of the pole pieces with additional shading rings. Preferably, the ring 46 has a resistance of approximately $7 \times 10^{-4}$ ohms and is formed from No. 16 B. & S. gauge wire. In order that there will be only one rotor position for each pole which is favorable to the production of a strong attractive force, the ring 46 preferably encloses approximately two-thirds of the pole piece 9. When the rotor is in the synchronous position shown in Fig. 6, a path of low reluctance indicated by the line 47 is available for the unshaded flux. In this position, one of the rotor poles is disposed opposite the shaded area 19 but threading of the unshaded flux through this pole is opposed by the bucking action produced by the currents induced in the ring 46. Thus the unshaded flux is confined effectually to the path 47 and utilized most effectually in locking the rotor in step with the pulsating field. When the rotor turns approximately 60 degrees from the position shown in Fig. 6, it will be seen that the reluctance of the flux path from the stator to the rotor remains substantially constant on one side of the rotor while it varies approximately 100 per cent on the other side thereof. As a result, a strong synchronizing effect is imposed on the rotor.

It will be noted that in all of the motors shown the shading rings are in each instance located on what may conveniently be termed corresponding portions of the pole pieces, that is, on the same sides of the successive pole pieces although they do in some instances enclose portions of different cross-sectional area.

This application is a continuation of my former application Serial No. 651,515, filed January 13, 1933.

I claim as my invention:

1. A synchronous alternating current motor combining a stator providing two opposed pole pieces having faces defining a rotor recess approximately five-eighths of an inch in diameter, short-circuited rings on said pole pieces shading corresponding side portions thereof, a rotor composed of magnetizable material of low magnetic retentivity and having a central core and three salient pole projections extending therefrom to a point closely adjacent said stator pole faces, a squirrel cage winding on said core, means providing magnetic paths of low reluctance adjacent said rotor and between the shaded and unshaded side tips of said stator pole projections, said rotor pole projections being approximately five thirty-seconds of an inch in height and each having an end face including a polar arc of approximately sixty degrees with intervening non-magnetic segmental gaps of substantially equal circumferential lengths.

2. A synchronous alternating current motor combining a stator having an energizing winding and providing a plurality of annularly spaced pole pieces, a plurality of short-circuited rings on one of said pieces progressively shading one side portion thereof, means for shading a corresponding side portion of another of said pole pieces producing a lesser degree of shading than said rings, a rotor in the recess defined by said stator pole pieces composed of magnetizable material of low magnetic retentivity and comprising a central core and a plurality of salient pole projections extending therefrom with their faces spaced apart a distance substantially equal to the spacing of the unshaded and most heavily shaded areas of said first mentioned pole piece, a short-circuited winding on said rotor for causing an induction motor torque to be created upon energization of said stator, and a magnetic connection closely following the rotor contour and interposed between the unshaded side portion of said second pole piece and the most heavily shaded side portion of said first mentioned pole piece.

3. A synchronous alternating current motor comprising, in combination, a stator having an energizing winding and a plurality of annularly spaced pole pieces having end faces defining a rotor recess, a pair of shading rings on one of said pieces dividing the pole section substantially equally into an unshaded side section, an intermediate section shaded by one ring and a side section shaded by both of said rings, a single shading ring enclosing a portion of another of said pieces on the corresponding side thereof, a rotor composed of magnetizable material of low magnetic retentivity and comprising a core having equally spaced salient projections greater in number than the stator poles and spaced apart a distance substantially equal to the spacing of the unshaded and double shaded face areas of said first mentioned piece, and a conductor on said rotor in which currents are induced to produce induction motor action.

4. A synchronous alternating current motor combining a stator having an energizing winding and providing a plurality of annularly spaced pole pieces, a short-circuited ring enclosing a side portion of one of said pole pieces and shading a major portion of the pole piece section, means for shading a corresponding but substantially smaller side portion of another of said pieces, the remaining portions of the pole pieces being unshaded, a rotor in the recess defined by the end faces of said pole pieces composed of magnetizable material of low magnetic retentivity and including a central core and an odd number of salient pole projections for each pair of said pole pieces extending therefrom in annularly spaced relation, and a short-circuited winding on said rotor.

5. A synchronous alternating current motor combining a stator having two pole pieces which are polarized oppositely when the stator is energized, a short-circuited shading ring enclosing a side portion of one of said pieces, a second shading ring on said last mentioned piece enclosing the same portion as said first ring and an additional adjacent section leaving one side of the piece unshaded, means including a shading ring enclosing a section of said other pole piece corresponding to but substantially greater in area than the section enclosed by said first mentioned ring for producing a substantially uniformly shaded area on said other pole piece, the remainder of said other pole piece being unshaded, means providing a magnetic path of low reluctance between the unshaded area of said second pole piece and the double shaded area of said first pole piece and constituting an enlargement of the unshaded face area of said second pole piece, a synchronous rotor comprising a central iron portion and a series of salient pole projections extending therefrom greater in number than the stator poles, and a squirrel cage carried by said rotor.

6. A synchronous alternating current motor combining a stator having pole pieces which are polarized oppositely when the stator is energized, shading means on one side of one of said pieces enclosing the major portion of the piece cross-section leaving the remaining side unshaded, shading means enclosing a section of the other pole piece to define shaded and unshaded pole face areas corresponding approximately in size to the areas defined by said first mentioned shading means, a synchronous rotor comprising a central iron portion and three equally spaced salient pole projections extending therefrom for each pair of stator pole pieces, a squirrel cage carried by said rotor, and means providing a magnetic path of low reluctance between the unshaded area of said second pole piece and the shaded side of said first pole piece and constituting an enlargement of the unshaded face area of said second pole piece so as to completely overlap one of said pole projections when the adjacent projection is disposed opposite the unshaded area of said first mentioned pole piece.

7. A synchronous alternating current motor combining a stator having at least two pole pieces defining a rotor recess and which are polarized oppositely when the stator is energized, shading means enclosing a side portion of one of said pole pieces, shading means including a short-circuited winding enclosing a side portion of said other pole piece and having a resistance substantially greater than said first mentioned means for producing an unsymmetrical distribution of shaded and unshaded fluxes about the rotor recess, and a rotor in said recess exposed to the faces of said poles and having synchronous and also induction motor characteristics.

8. A synchronous alternating current motor comprising, in combination, a stator providing two opposed pole pieces, a rotor composed of material of low magnetic retentivity and comprising a central core and three substantially equally spaced and radially extending salient pole projections exposed to the faces of said pole pieces, short-circuited rings enclosing side portions of said pole pieces and shading the same unequally, magnetic extensions of the unshaded side tips of said pole pieces each following closely around said rotor substantially uninterruptedly to the shaded side of the adjacent pole piece whereby, when one rotor pole projection is disposed opposite the unshaded section of one stator pole face, an adjacent projection will be disposed opposite the remote end of the extension joined to the unshaded section of the other pole piece.

9. A synchronous alternating current motor comprising, in combination, a stator providing a plurality of pole pieces, short-circuited rings differentially shading the pole pieces which are oppositely polarized when said stator is excited by alternating current, a rotor comprising a core of magnetic material having three salient pole projections for each pair of stator pole pieces, and means on said rotor acting to create induction motor torque when the stator is excited.

10. A synchronous alternating current motor combining a stator having a plurality of pole pieces defining a rotor recess and having shading means thereon acting, when the stator is excited, to cause shifting of the magnetic field around said recess, a rotor in said recess having salient projections greater in number than the stator poles whereby to establish a synchronous speed substantially less than the speed of said field, and means on said rotor cooperating with said field to produce induction motor action tending to rotate said rotor at a speed greater than said synchronous speed, said shading means acting differentially on said pieces whereby to render said rotating field unsymmetrical with respect to the faces of at least one cooperating pair of said pieces whereby to permit said synchronous speed to be maintained.

11. A synchronous alternating current motor combining a stator providing at least two pole pieces having opposite polarity when the stator is energized, shading means enclosing a major portion of one pole piece and dividing the end face thereof into an unshaded area and a larger shaded area, shading means on the corresponding side of said other pole piece dividing the end face thereof into an unshaded area and a shaded area substantially smaller than said first mentioned shaded area, and a rotor having three equally spaced salient pole projections per pair of stator poles having intervening non-magnetic gaps between them substantially equal in circumferential length to the effective circumferential length of said unshaded area of said one pole piece.

12. A synchronous alternating current motor combining a stator providing a plurality of pole pieces defining a rotor recess and annularly spaced therearound, the adjacent poles being oppositely polarized upon energization of the stator, means shading one side portion of one pole piece and dividing the face thereof into an unshaded area and a shaded area substantially twice as large, means shading the corresponding side portion of another pole piece and dividing the face thereof into a shaded area substantially equal to said unshaded area and an unshaded area substantially equal to said first mentioned shaded area, a rotor in said recess having three salient pole projections for each pair of stator pole pieces and intervening non-magnetic gaps, magnetic extensions of the unshaded side tip of each pole closely following the rotor contour and projecting to the shaded side tip of the adjacent pole, and a magnetic restriction interposed in the extension between the smaller shaded and unshaded areas and acting to limit the effective circumferential length of such unshaded area substantially to the length of one of said rotor projections.

13. A synchronous alternating current motor combining a stator providing at least two pole pieces which are oppositely polarized when the stator is excited, means shading corresponding side portions of said pole pieces and dividing the faces thereof into unshaded and shaded areas, a rotor composed of magnetizable material of low magnetic retentivity and having salient pole projections greater in number than the number of said pieces and separated by intervening segmental gaps of substantial lengths and a magnetic extension of the unshaded side tip of one of said pole pieces closely following the rotor contour, said unshaded and shaded areas of the two pole pieces being proportioned and spaced relative to each other so that two of said projections will be exposed to said extension and the adjacent unshaded area when another projection is opposite the unshaded area of the other stator pole.

14. A synchronous alternating current motor combining a rotor composed of magnetizable material of low magnetic retentivity and having a plurality of radially disposed salient pole projections separated by segmental non-magnetic gaps, a stator providing at least two pole pieces having end faces providing a substantially continuous surface overlapping three of said projections and three of said gaps, and means shading corresponding side portions of said pole pieces and defining unshaded areas of different sizes on said surface, the area on the face of one pole overlapping two of said rotor projections when another rotor projection is opposite the unshaded area of the other stator pole.

15. A synchronous motor having, in combination, a stator having a plurality of pole pieces defining a rotor recess and adapted to be energized by alternating current, shading means operating to cause shifting of the magnetic field around said recess when the stator is energized, a rotor in said recess composed of magnetizable material of low magnetic retentivity and comprising a core with a plurality of salient pole projections spaced apart a distance approximately equal to their circumferential length, and a squirrel cage winding on said core in which currents are induced to produce induction motor action, there being three of said salient rotor poles for each pair of stator poles whereby to establish a sub-synchronous operating speed nearest the speed at which the motor operates most efficiently as an induction motor.

16. A sub-synchronous motor having, in combination, a stator having a plurality of pole pieces defining a rotor recess and adapted to be energized by alternating current, shading means operating to cause shifting of the magnetic field around said recess when the stator is energized, and a rotor in said recess composed of magnetizable material having low magnetic retentivity and comprising a core with three salient pole projections for each pair of stator pole pieces, said projections being of substantially equal circumferential lengths separated by intervening non-magnetic gaps each having a circumferential length at least equal to one-fourth of the rotor pole pitch, the number of said projections being greater than the number of said pole pieces whereby to establish a predetermined sub-synchronous operating speed equal to two-thirds of the true synchronous speed, and a squirrel cage winding on said core in which currents are induced to produce induction motor torque capable of initiating rotation of said rotor and accelerating the same to said sub-synchronous speed.

17. A sub-synchronous motor having, in combination, a stator having 2N pole pieces defining a rotor recess and adapted to be energized by alternating current, shading means on said pole pieces operating to cause shifting of the magnetic field around said recess, a rotor in said recess composed of magnetizable material of low magnetic retentivity, said rotor being provided with means including 3N equally spaced salient pole projections on said rotor composed of low retentivity material and cooperating with said stator for establishing a sub-synchronous operating speed of said rotor equal to two-thirds of the true synchronous speed as determined by the number of stator poles, and a winding on said rotor in which currents are induced by the stator field, said stator and said rotor cooperating to produce induction motor torque capable of initiating rotation of the rotor and accelerating the same to said sub-synchronous speed.

18. A sub-synchronous alternating current motor having, in combination, a stator having a plurality of annularly spaced pole pieces, substantially closed magnetic connections between the adjacent side tips of the adjacent pole pieces cooperating with the faces thereof to define a substantially continuous cylindrical iron surface, means shading corresponding side portions of said pole pieces, a rotor within said surface composed of magnetizable material of low magnetic retentivity and having a plurality of annularly spaced salient pole projections greater in number than the number of said pole pieces, whereby to establish a sub-synchronous operating speed of said rotor, a squirrel cage winding on said rotor cooperating with said stator to produce induction motor torque sufficient to initiate rotation of said rotor and accelerate the same to said sub-synchronous speed, and annularly spaced magnetic restrictions in said stator confining the flow of unshaded flux from the stator into the rotor through an intervening pole face area spanning only one of said rotor projections.

19. A sub-synchronous motor having, in combination, a stator adapted to be energized by alternating current and having a plurality of annularly spaced pole pieces, short-circuited coils of low resistance heavily shading corresponding side portions of said pole pieces, a rotor between the faces of said pole pieces composed of magnetizable material of low magnetic retentivity and having a plurality of salient pole projections, extensions of the unshaded side tips of said pole pieces following the rotor contour and providing substantially closed magnetic connections between the adjacent pole pieces, said rotor pole projections being sufficient in number relative to the number of pole pieces and spaced apart sufficient distances to establish a sub-synchronous operating speed of at least one-half of the true synchronous speed of the motor, and said stator being constructed to provide a single low reluctance flux path through the rotor extending through the unshaded face area of one of said pole pieces and a single rotor projection in register therewith, and a squirrel cage winding on said rotor cooperating with said pole pieces, said shading means and said extensions to produce strong induction motor action capable of starting and accelerating said rotor to said sub-synchronous speed.

20. A sub-synchronous alternating current motor having, in combination, an even number of annularly spaced pole pieces, shading means enclosing corresponding side portions of said pole pieces, a rotor between said poles composed of magnetizable material of low magnetic retentivity and having an odd number of annularly spaced salient pole projections for each pair of stator pole pieces greater than the number of said pole pieces, and a short-circuited winding on said rotor cooperating with said stator to produce induction motor torque, the areas of said side portions on the adjacent pole pieces being of different widths whereby one of said projections will be disposed opposite the unshaded face area of one pole piece when another of the projections is disposed opposite the unshaded face area of the adjacent pole piece.

21. A sub-synchronous alternating current motor having, in combination, an even number of annularly spaced pole pieces, short-circuited coils shading corresponding side portions of said pole pieces, a rotor in the recess defined by the faces of said pole pieces composed of magnetizable material of low magnetic retentivity and having an odd number of salient pole projections for each pair of said pole pieces greater than the number of said pole pieces and each corresponding in circumferential length approximately to the effective unshaded face area of one of said pole pieces, a short-circuited winding on said rotor cooperating with said stator to produce induction motor action, and a magnetic extension of the unshaded side tip of the adjacent pole piece spanning substantially the entire area of one of said projections when the adjacent projection is disposed opposite said unshaded face area.

22. A sub-synchronous alternating current motor having, in combination, a stator having a plurality of annularly spaced pole pieces with faces defining a rotor recess, a rotor between said poles composed of magnetizable material of low magnetic retentivity and having annularly spaced salient pole projections greater in number than the number of said pole pieces, a short-circuited winding on said rotor cooperating with said stator to produce induction motor action, means shading corresponding side portions of said stator pole pieces, and magnetic restrictions separating the shaded and unshaded face areas of said pole pieces and defining an unshaded face area on one pole piece substantially equal in circumferential length to the circumferential length of one of said projections, and an unshaded area on the adjacent pole piece of substantially different circumferential length than said first mentioned unshaded area and disposed opposite one rotor projection when another rotor projection is in registry with said first mentioned unshaded area.

23. A self-starting subsynchronous motor comprising, in combination, a stator unit having a plurality of annularly disposed pole pieces, means for shading corresponding side portions of said pole pieces, a rotor unit having a plurality of salient pole projections cooperating with the pole pieces of said stator unit, said projections being greater in number than said pole pieces, at least one of the pole pieces of said stator unit having an unshaded portion of major facial extent in a direction circumferentially of the rotor as compared to the salient projections of said rotor unit which are of minor facial extent, the said major extent and minor extent pole piece portion and projections being proportioned relative to each other to provide a magnetic path free of major variations at substantially all positions of relative movement therebetween, another of said stator unit pole pieces also having an unshaded portion of smaller facial extent than said major extent pole piece cooperating with said rotor to provide a flux path therebetween which varies widely in reluctance to produce a synchronous torque on said rotor.

24. A self-starting subsynchronous motor comprising, in combination, a stator unit having a plurality of annularly disposed pole pieces, means for shading corresponding side portions of said pole pieces, a rotor unit having a plurality of salient pole projections cooperating with the pole pieces of said stator unit, said projections being greater in number than said pole pieces, at least one of the pole pieces of said stator unit having an unshaded portion of substantially greater circumferential length than said rotor projections and cooperating with successive rotor projections to form a mobile flux path therebetween as the rotor projections move across the same, another of said stator pole pieces having an unshaded portion of substantially the same circumferential length as said rotor projections and cooperating with successive rotor projections to form a substantially fixed flux path therebetween as the rotor projections cross the same.

25. A sub-synchronous alternating current motor having, in combination, a stator having a plurality of annularly spaced pole pieces, substantially closed magnetic connections between the adjacent side tips of the adjacent pole pieces cooperating with the faces thereof to define a substantially continuous cylindrical iron surface, means shading corresponding side portions of said pole pieces, a rotor within said surface composed of magnetizable material of low magnetic retentivity and having a plurality of annularly spaced salient pole projections greater in number than the number of said pole pieces, whereby to establish a sub-synchronous operating speed of said rotor, a squirrel cage winding on said rotor cooperating with said stator to produce induction motor torque sufficient to initiate rotation of said rotor and accelerate the same to said sub-synchronous speed, and means for confining the flow of unshaded flux to the rotor to unsymmetrically arranged areas of said cylindrical iron surface.

26. A sub-synchronous alternating current motor including, in combination, a stator having at least two pole pieces defining a rotor recess which are polarized oppositely when the stator is energized, means for producing a different geometrical distribution of shaded and unshaded flux across the face of one pole piece than across the opposite pole face including shading means enclosing corresponding side portions of said pole pieces, a rotor in said recess exposed to the faces of said poles, and means including a plurality of salient pole projections on said rotor for producing a sub-synchronous characteristic therein, said salient pole projections being greater in number than said pole pieces.

EDGAR D. LILJA.